(12) United States Patent
Kenney et al.

(10) Patent No.: US 11,837,869 B2
(45) Date of Patent: Dec. 5, 2023

(54) POWER SUPPLY APPARATUS

(71) Applicant: SIEMENS AKTIENGESELLSCHAFT, Munich (DE)

(72) Inventors: Richard Kenney, Crewe (GB); Yiran Chen, Birmingham (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/258,551

(22) PCT Filed: Jun. 12, 2019

(86) PCT No.: PCT/EP2019/065375
§ 371 (c)(1),
(2) Date: Jan. 7, 2021

(87) PCT Pub. No.: WO2020/011474
PCT Pub. Date: Jan. 16, 2020

(65) Prior Publication Data
US 2021/0151990 A1    May 20, 2021

(30) Foreign Application Priority Data
Jul. 9, 2018  (EP) .................................. 18182365

(51) Int. Cl.
H02J 3/46      (2006.01)
H02M 3/335    (2006.01)
H02H 7/22     (2006.01)

(52) U.S. Cl.
CPC .............. H02J 3/46 (2013.01); H02H 7/22 (2013.01); H02M 3/33576 (2013.01)

(58) Field of Classification Search
CPC ......... H02J 3/46; H02H 7/22; H02M 3/33576
(Continued)

(56) References Cited

U.S. PATENT DOCUMENTS

| 6,218,744 B1 * | 4/2001 | Zahrte, Sr. ............ H02M 7/797 307/64 |
| 7,099,163 B1 * | 8/2006 | Ying ................. H02M 3/33523 363/49 |

(Continued)

FOREIGN PATENT DOCUMENTS

| EP | 0706256 A2 | 4/1996 |
| EP | 1122873 A2 | 8/2001 |

(Continued)

OTHER PUBLICATIONS

International Search Report and the Written Opinion for International Patent Application PCT/EP2019/065375 dated Jul. 24, 2019.
(Continued)

*Primary Examiner* — Michael R. Fin
(74) *Attorney, Agent, or Firm* — Lempia Summerfield Katz LLC

(57) ABSTRACT

A power supply apparatus, including: a transformer including a first primary winding for connection to a first power source and a second primary winding for connection to a second power source, and a secondary winding for delivering power therefrom as the output of the power supply apparatus; a controller for receiving voltage inputs from the first power source and the second power source, and in response to the received voltage inputs control supply from the first power source to the first primary winding and from the second power source to the second primary winding, such that: if the first power source and second power source are available the controller operates to allow power to be supplied to the first primary winding from the first power source and operates to shut off supply of power to the second primary winding from the second power source.

16 Claims, 3 Drawing Sheets

(58) Field of Classification Search
USPC .......................................................... 307/64
See application file for complete search history.

(56) References Cited

U.S. PATENT DOCUMENTS

| | | | |
|---|---|---|---|
| 2009/0058188 A1 | 3/2009 | Kotani | |
| 2015/0256029 A1* | 9/2015 | Cinti | H02J 9/061 |
| | | | 307/64 |
| 2016/0352127 A1* | 12/2016 | Prakash | H02J 9/062 |
| 2020/0006974 A1* | 1/2020 | Ghosh | H02M 3/33523 |

FOREIGN PATENT DOCUMENTS

| | | |
|---|---|---|
| JP | H0946929 A | 2/1997 |
| JP | H1189113 A | 3/1999 |

OTHER PUBLICATIONS

European Search Report for European Application No. 18182365.9-1202 dated Nov. 7, 2018.

* cited by examiner

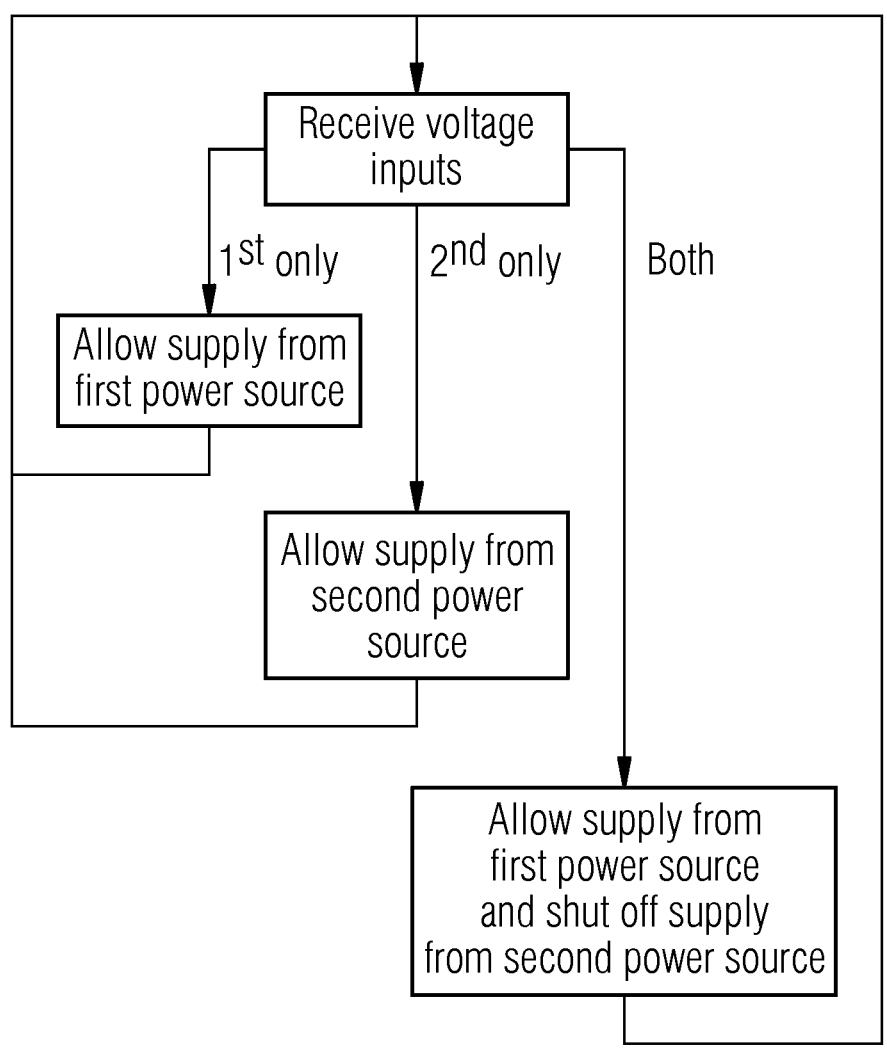

POWER SUPPLY APPARATUS

CROSS REFERENCE TO RELATED APPLICATIONS

This present patent document is a § 371 nationalization of PCT Application Serial Number PCT/EP2019/065375 filed Jun. 12, 2019, designating the United States, which is hereby incorporated in its entirety by reference. This patent document also claims the benefit of EP 18182365.9 filed on Jul. 9, 2018 which is also hereby incorporated in its entirety by reference.

FIELD

Embodiments relate to a power supply apparatus and methods that are used to control the supply of power from two or more sources.

BACKGROUND

In many situations it is desirable to operate electronic equipment from two or more power sources that are electrically isolated from each other. For example, use of two power sources may build in redundancy to increase reliability.

However, multiplying up of power supplies to handle input from different sources, with power supply apparatus each made up of a transformer with associated independent input and output circuits for each power source, and provision of a control unit to manage the overall operation of the power supplies may introduce significant additional cost.

Rather than a simple parallel arrangement of multiple independent power supplies, a cascaded approach has been used, in which a first power supply apparatus produces an output that is compatible with the power source that is connected to the input of a second power supply apparatus. With this configuration a simple diode arrangement may be used to connect the output of the first power supply apparatus to the input of the second power supply apparatus. However, there are still challenges in managing the operation of the first and second power supply apparatus to give a consistent overall output, while avoiding the expense of providing multiple equivalent components.

Hence an improved power supply apparatus for use with two or more power sources, that may provide a consistent output while reducing cost compared to use of parallel multiple independent power supply apparatus is desirable.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a power supply apparatus including a transformer including a first primary winding for connection to a first power source and a second primary winding for connection to a second power source, and a secondary winding for delivering power therefrom as the output of the power supply apparatus; a controller for receiving voltage inputs from the first power source and the second power source, and in response to the received voltage inputs control supply from the first power source to the first primary winding and from the second power source to the second primary winding, such that if the first power source and second power source are available the controller operates to allow power to be supplied to the first primary winding from the first power source and operates to shut off supply of power to the second primary winding from the second power source.

In one example, the controller is configured to receive voltage inputs from the first power source and the second power source, and in response to the received voltage inputs control supply from the first power source to the first primary winding and from the second power source to the second primary winding, such that if the first power source is available and the second power source is not, the controller operates to allow power to be supplied from the first power source to the first primary winding.

In one example, the controller is configured to receive voltage inputs from the first power source and the second power source, and in response to the received voltage inputs control supply from the first power source to the first primary winding and from the second power source to the second primary winding, such that if the second power source is available and the first power source is not, the controller operates to allow power to be supplied from the second power source to the second primary winding.

In this way, the power supply apparatus operates so that power from the first power source energizes the first primary winding of the transformer, if available. The second power source may act as a backup in case of failure of the first power source. This provides a more reliable output from the secondary winding, while in the same time maintaining proper isolation between the first and second power supplies in the transformer. A power supply apparatus including a single transformer with first and second primary windings may be made more cheaply, and occupy less space than two separate transformers with independent controllers.

In one example the controller includes a voltage detection circuit and a voltage shut down circuit. In one example the voltage detection circuit is configured to receive power from the first power supply. In one example the voltage detection circuit is configured to detect availability of power from the first power source, and in response may operate to allow supply of power to the first primary winding from the first power source. In one example the voltage detection circuit is coupled to a drive circuit for the first primary winding, and configured to cause the drive circuit for the first primary winding to supply power to the first primary winding from the first power source, when power is available from the first power source.

In one example the voltage shut down circuit may operate to shut off the supply of power to the second primary winding from the second power source. In one example the voltage shut down circuit is configured to selectively provide a shutdown signal to a drive circuit for the second primary winding. In one example the shutdown signal from the voltage shut down circuit is provided in order to control the drive circuit for the second primary winding to shut down supply to the second primary winding when the first primary winding is energized by power form the first power supply.

In one example the voltage shut down circuit includes a switch, for example a transistor switch, coupled to the first power source. In one example the switch of the voltage shut down circuit is configured to generate the shutdown signal when a drive circuit for the first primary winding operates to supply power to the first primary winding from the first power source.

In one example the voltage shut down circuit provides electrical isolation between circuit elements connected to the first power source and circuit elements connected to the second power source. In one example the voltage shut down circuit provides electrical isolation between a drive circuit for the first primary winding and a drive circuit for the second primary winding. In one example the voltage shut down circuit includes an opto-coupler.

In one example the controller further includes an under-voltage lock circuit. The under-voltage lock circuit is configured to detect an under-threshold voltage, and in response to prevent the controller from allowing power to be supplied to the first primary winding from the first power source. In one example the under-voltage lock circuit is configured to detect an under-threshold voltage at the first power supply. In one example the under-voltage lock circuit is configured to allow the operation of the controller to supply power from the first power source to the first primary winding only when the first power source provides greater than the under-threshold voltage. In one example the under-voltage lock circuit includes a transistor switch, biased to turn on when the first power source provides greater than an under-threshold voltage.

Accordingly, a method of controlling a power supply apparatus is provided that includes a transformer with a first primary winding connected to a first power source and a second primary winding connected to a second power source, and a secondary winding to deliver power therefrom as the output of the power supply apparatus; the method including: receiving voltage inputs from the first power source and the second power source, and in response to the received voltage inputs controlling supply from the first power source to the first primary winding and from the second power source to the second primary winding, such that: if the first power source and second power source are available, allowing power to be supplied to the first primary winding from the first power source and shutting off supply of power to the second primary winding from the second power source.

In one example, the method includes receiving voltage inputs from the first power source and the second power source, and in response to the received voltage inputs controlling supply from the first power source to the first primary winding and from the second power source to the second primary winding, such that if the first power source is available and the second power source is not, allowing power to be supplied from the first power source to the first primary winding.

In one example, the method includes receiving voltage inputs from the first power source and the second power source, and in response to the received voltage inputs controlling supply from the first power source to the first primary winding and from the second power source to the second primary winding, such that if the second power source is available and the first power source is not, allowing power to be supplied from the second power source to the second primary winding.

In one example the method includes operating a drive circuit for the first primary winding to supply power to the first primary winding from the first power source, when power is available from the first power source.

In one example the method includes shutting off the supply of power to the second primary winding from the second power source in response to a shutdown signal provided to a drive circuit for the second primary winding. In one example the method includes providing the shutdown signal to the drive circuit for the second primary winding to shut down supply to the second primary winding when the first primary winding is energized by power form the first power supply.

In one example the method includes transmitting the shutdown signal via an electrical isolator between a drive circuit for the first primary winding and a drive circuit for the second primary winding. In one example the method includes transmitting the shutdown signal via an opto-coupler.

In one example the method further includes detecting an under-threshold voltage, and in response preventing supply of power from the first primary winding from the first power source. In one example the method includes detecting the under-threshold voltage at the first power supply. In one example the method includes supplying power from the first power source to the first primary winding only when the first power source provides greater than the under-threshold voltage.

BRIEF DESCRIPTION OF THE DRAWINGS

Examples of the present disclosure will now be described with reference to the accompanying drawings, in which:

FIG. 3 is a schematic flow diagram of steps in a method of controlling a power supply apparatus, according to an embodiment.

DETAILED DESCRIPTION

Figure 1:
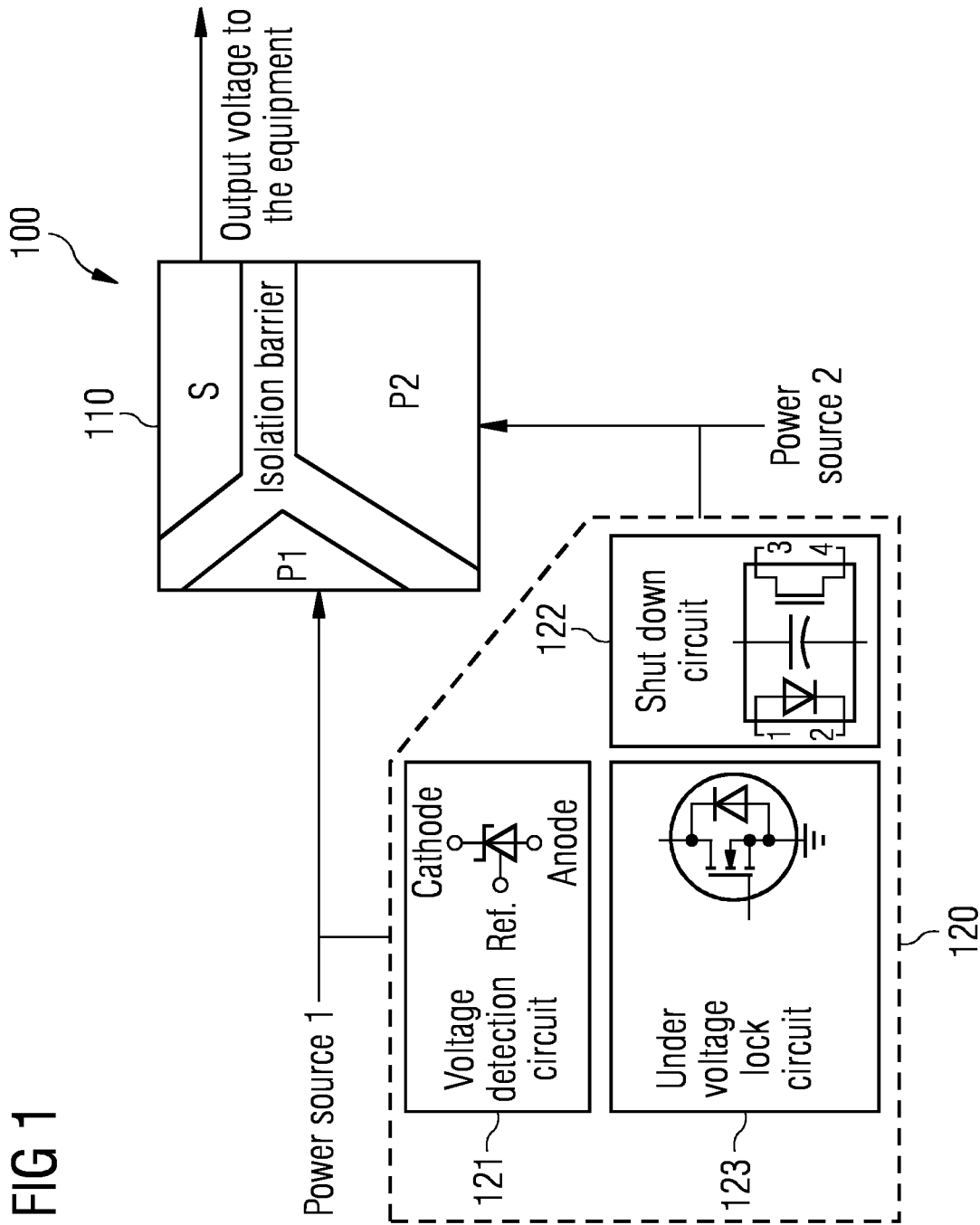
FIG. 1 depicts a schematic overview of a power supply apparatus according to an embodiment.

As shown in FIG. 1, a power supply apparatus 100 is connected to a first power source 1 and a second power source 2, and is configured to provide an output voltage for electrical equipment.

The power supply apparatus 100 includes a transformer 110 and a controller 120. The transformer 110 includes a first primary winding P1 connected to the first power source 1, a second primary winding P2 connected to the second power source 2, and a secondary winding S for delivering power as the output of the power supply apparatus 100. In the example shown, the first power source 1 operates at a decisive voltage of 400V, whereas the second power source 2 operates at a decisive voltage of 24V. The power supply apparatus 100 is required to maintain electrical isolation between the first and second power sources 1, 2 and as such the transformer 110 includes an isolation barrier between each of the windings P1, P2, S.

In order to achieve continuous even in the case where one or other of the power sources 1, 2 is not wholly reliable, the controller 120 is configured to control and manage supply of power from the first and second power sources 1, 2 to the first and second primary windings P1, P2 respectively. This takes place on start-up, and continuously thereafter, according to the availability of power from the first and second power sources 1, 2.

The controller 120 receives voltage inputs from the first power source 1 and the second power source 2, and in response to the received voltage inputs controls supply from the first power source 1 to the first primary winding P1 and from the second power source 2 to the second primary winding P2 such that if the first power source and second power source are both available, power is supplied only to the first primary winding P1 from the first power source 1. The controller 120 shuts off supply of power to the second primary winding P2 from the second power source 2. This action means that there is no conflict from driving current simultaneously into P1 and P2, and the transformer 110 operates according to the ratio of the first primary winding P1 and the secondary winding S.

If only one or other of first and second power source 1, 2 is operative to supply power, then the controller 120 is configured to use that power source to supply the corresponding first or second primary winding P1, P2. If, during operation of the controller 120 to allow supply power from the second power source 2 to the second primary winding P2, for example while the first power source 1 is not available, the first power source 1 becomes available, the controller 120 is configured to switch over to using power from the first power source 1, and to inhibit the supply of power from the second power source 2 to the second primary winding.

Automatic, interruption free switching between first and second power sources 1, 2 according to their availability as described, is provided by the controller 120 by use of a voltage detection circuit 121, a voltage shut down circuit 122 and an under-voltage lock circuit 123.

The voltage detection circuit 121 detects availability of power from the first power source 1, and in response allows supply of power to the first primary winding P1 from the first power source 1, if power is indeed available. For example, a voltage comparison may be performed, by comparing the voltage of the first power supply to a value produced by a voltage reference circuit to determine if the first power source 1 is available. In this embodiment the value produced by the voltage reference circuit is generated using a Zener diode. The voltage shut down circuit 122 shuts off the supply of power to the second primary winding P2 from the second power source 2 in this scenario. The voltage shut down circuit 122 includes a switch, for example a transistor switch, coupled to the first power source such as via an isolator, so that the controller may interrupt the connection/delivery of power from the second power source 2 to the second primary winding P2.

The under-voltage lock circuit 123 is configured to detect an under-threshold voltage at the first power source P1, and in response to prevent the controller 120 from allowing power to be supplied to the first primary winding P1 from the first power source 1. The provision of the under-voltage lock circuit 123 as a separate unit form the voltage detection circuit 121 is advantageous, as it allows the voltage comparison performed by the voltage detection circuit 121 to be performed easily, and provides a degree of security when switching of operation back to using the first power supply 1 from using the second power supply 2, in that switching may only take place when the under-voltage lock circuit 123 determines that the first power supply has returned and is able to supply sufficient power that the required reference value may be reached. The under-voltage lock circuit 123 may include a transistor switch, biased to turn on when the first power source 1 provides greater than an under-threshold voltage.

Figure 2:
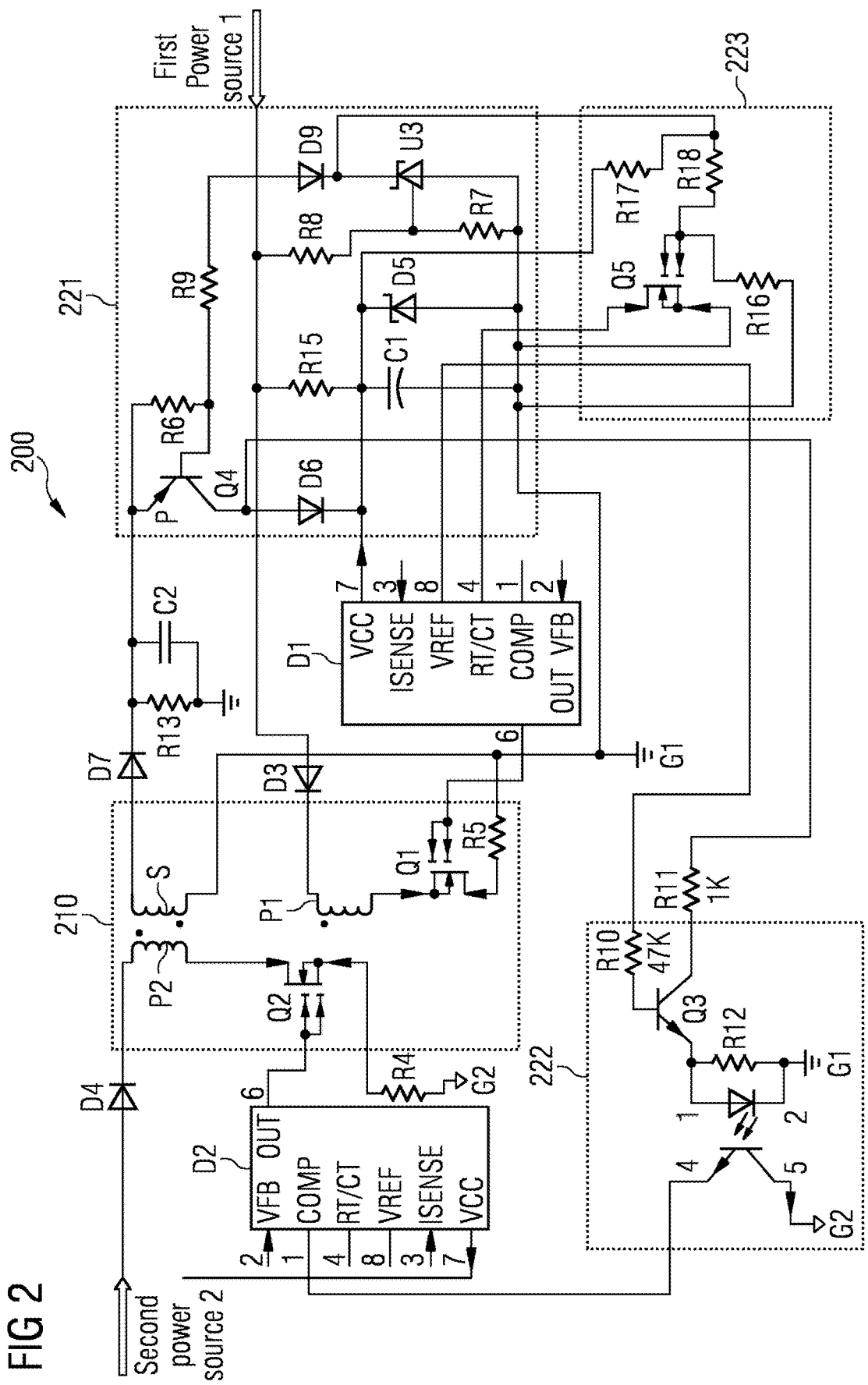
FIG. 2 is a schematic circuit diagram of a power supply apparatus according to an embodiment.

FIG. 2 depicts a schematic circuit diagram of a power supply apparatus 200 according to a second example embodiment. The power supply apparatus 200 is connected to a first power source 1, and a second power source 2. In common with the first embodiment above, the power supply apparatus 200 includes a transformer 210 with first and secondary primary windings P1, P2 connected to the first and second power supplies 1, 2 respectively, and a secondary winding S that serves to generate an output. The transformer 210 is provided with primary switching elements Q1, Q2, input rectifiers D3, D4, an output rectifier D7 and an output filter R13, C2. The operation of the primary switching elements takes place under the control of the controller. The power supply apparatus 200 includes a voltage detection circuit 221 that includes a voltage reference circuit U3. The voltage reference circuit U3 in this embodiment is provided as a Zener shunt regulator, and is configured to provide a reference voltage for detection of the first power source 1, a voltage shut down circuit 222 and an under-voltage lock circuit 223. In addition, drive circuits D1, D2 are provided for the primary switching elements, as integrated circuits. Suitable devices are available from Texas Instruments in their UCx84x family of current-mode PWM controller devices.

The voltage detection circuit 221, a voltage shut down circuit 222 and an under-voltage lock circuit 223 operate as described in relation to the embodiment of FIG. 1. The first and second power sources 1, 2 are electrically isolated from one another by the transformer 210, and that different ground references G1, G2 are provided for the two power sources 1, 2. The voltage shut down circuit 222 selectively provides a shutdown signal to a drive circuit D2 for the second primary winding P1, to cause the when the first primary winding is energized by power form the first power supply. The voltage shut down circuit 222 includes an opto-isolator to maintain electrical isolation between the first and second power supplies 1, 2 and their associated circuits, and operates to cause the drive circuit D2 to be in active in response to transistor switch Q3 being energized, that is, while the drive circuit D1 is operational.

The under-voltage lock circuit 223 allows operation of the drive circuit D1 only when the first power source provides greater than the under-threshold voltage, because if the first power source is providing less than the under-threshold voltage the voltage detection circuit 211 does not operate to energize the drive circuit D1. Switching on and off the voltage detection circuit 221 by the under-voltage lock circuit 223 takes place according to operation of the transistor switch Q5, that is biased to turn on when the first power source provides 1 greater than the under-threshold voltage.

FIG. 3 is a schematic flow diagram of steps in a method of controlling a power supply apparatus, according to an example embodiment. In the first step the power supply receives voltage inputs from the first and second power sources. There are three possible options: the first power supply only provides voltage, that results in the power supply apparatus allowing supply from the first power supply to the first primary of the transformer; the second power supply only provides voltage, that results in the power supply apparatus allowing supply from the second power supply to the second primary of the transformer; and the first and second power supplies both provides voltage, that results in the power supply apparatus allowing supply from the first power supply to the first primary of the transformer and shutting off supply from the second power supply to the second primary of the transformer. The method of FIG. 3 is performed continuously, in order to maintain supply if one or other of the first and second power supplies drops out, and in order that the first power supply is used in preference to the second power supply if both are present.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A power supply apparatus, comprising:
    a transformer comprising a first primary winding configured for connection to a first power source and a second primary winding configured for connection to a second power source, and a secondary winding configured for delivering power therefrom as an output of the power supply apparatus; and
    a controller configured to receive voltage inputs from the first power source and the second power source, and in response to the received voltage inputs control supply from the first power source to the first primary winding and from the second power source to the second primary winding, such that when the first power source and second power source are available the controller operates to allow power to be supplied to the first primary winding from the first power source and operates to shut off supply of power to the second primary winding from the second power source;
    wherein the controller comprises:
        a voltage detection circuit configured to compare a voltage of the first power source to a value produced by a voltage reference circuit to determine for the controller that the first power source is available; and
        an under voltage lock circuit configured to detect an under-threshold voltage and prevent the controller from allowing power to be supplied to the first primary winding from the first power source.

2. The power supply apparatus of claim 1, wherein the controller is configured to receive voltage inputs from the first power source and the second power source, and in response to the received voltage inputs control supply from the first power source to the first primary winding and from the second power source to the second primary winding, such that:
    when the first power source is available and the second power source is not, the controller operates to allow power to be supplied from the first power source to the first primary winding.

3. The power supply apparatus of claim 1, wherein the controller is configured to receive voltage inputs from the first power source and the second power source, and in response to the received voltage inputs control supply from the first power source to the first primary winding and from the second power source to the second primary winding, such that:
    when the second power source is available and the first power source is not, the controller operates to allow power to be supplied from the second power source to the second primary winding.

4. The power supply apparatus of claim 1, wherein the voltage detection circuit is configured to receive power from the first power source, to detect power from the first power source, and in response to operate to allow supply of power to the first primary winding from the first power source according to a drive circuit for the first primary winding.

5. The power supply apparatus of claim 1, wherein the controller further comprises a voltage shut down circuit operable to shut off a supply of power to the second primary winding from the second power source and configured to selectively provide a shut-down signal to a drive circuit for the second primary winding.

6. The power supply apparatus of claim 5, wherein the voltage shut down circuit is configured to generate the shut-down signal when a drive circuit for the first primary winding operates to supply power to the first primary winding from the first power source.

7. The power supply apparatus of claim 5, wherein the voltage shut down circuit provides electrical isolation between circuit elements connected to the first power source and circuit elements connected to the second power source.

8. The power supply apparatus of claim 1, wherein the under voltage lock circuit is configured to allow the controller to supply power from the first power source to the first primary winding only when the first power source provides a voltage greater than the under-threshold voltage.

9. A method of controlling a power supply apparatus that comprises a transformer with a first primary winding connected to a first power source, a second primary winding connected to a second power source, and a secondary winding to deliver power therefrom as an output of the power supply apparatus; the method comprising:
    receiving, by a controller comprising at least a voltage detection circuit and an under voltage lock circuit, voltage inputs from the first power source and the second power source;
    comparing, by the voltage detection circuit, the voltage of the first power source to a value produced by a voltage reference circuit to determine if the first power source is available;
    controlling supply, by the controller, in response to the received voltage inputs, from the first power source to the first primary winding and from the second power source to the second primary winding, such that when the first power source and second power source are available, allowing power to be supplied to the first primary winding from the first power source and shutting off supply of power to the second primary winding from the second power source;
    detecting, by the under voltage lock circuit, an under-threshold voltage; and
    preventing, based on the detection, power to be supplied to the first primary winding from the first power source.

10. The method of claim 9, further comprising:
    controlling supply, by the controller, in response to the received voltage inputs, from the first power source to the first primary winding and from the second power source to the second primary winding, such that when the first power source is available and the second power source is not, power is allowed to be supplied from the first power source to the first primary winding.

11. The method of claim 9, further comprising:
    controlling supply, by the controller, in response to the received voltage inputs, from the first power source to the first primary winding and from the second power source to the second primary winding, such that when the second power source is available and the first power source is not, power is allowed to be supplied from the second power source to the second primary winding.

12. The method of claim 9, further comprising:
operating a drive circuit for the first primary winding to supply power to the first primary winding from the first power source, when power is available from the first power source; and
shutting off the supply of power to the second primary winding from the second power source in response to a shut-down signal provided to a drive circuit for the second primary winding.

13. The method of claim 9, wherein the controller further comprises a voltage shut down circuit, the metho further comprising:
shuting off the supply of power, by the voltage shut down circuit, to the second primary winding from the second power source; and
generating a shut-down signal to a drive circuit for the second primary winding.

14. The method of claim 13, further comprising:
wherein generating the shut-down signal comprising generating the shut-down signal when a drive circuit for the first primary winding operates to supply power to the first primary winding from the first power source.

15. The method of claim 13, wherein the voltage shut down circuit provides electrical isolation between circuit elements connected to the first power source and circuit elements connected to the second power source.

16. The method of claim 9, further comprising:
allowing, by the under voltage lock circuit, power from the first power source to the first primary winding only when the first power source provides a voltage greater than the under-threshold voltage.

\* \* \* \* \*

UNITED STATES PATENT AND TRADEMARK OFFICE
CERTIFICATE OF CORRECTION

PATENT NO. : 11,837,869 B2
APPLICATION NO. : 17/258551
DATED : December 5, 2023
INVENTOR(S) : Richard Kenney and Yiran Chen It is certified that error appears in the above-identified patent and that said Letters Patent is hereby corrected as shown below:

In the Claims

Column 9, Claim 13; Lines 11:
"comprises a voltage shut down circuit, the metho further"
Should be replaced with:
"comprises a voltage shut down circuit, the method further"

Signed and Sealed this
Twelfth Day of March, 2024

Katherine Kelly Vidal
Director of the United States Patent and Trademark Office